United States Patent [19]

Tsukamoto et al.

[11] 4,163,434
[45] Aug. 7, 1979

[54] AIR-FUEL RATIO REGULATOR FOR INTERNAL COMBUSTION ENGINE

[75] Inventors: Yutaka Tsukamoto; Bonnosuke Takamiya, both of Joyo, Japan

[73] Assignee: Mitsubishi Jidosha Kogyo Kabushiki Kaisha, Japan

[21] Appl. No.: 808,553

[22] Filed: Jun. 21, 1977

[30] Foreign Application Priority Data

Mar. 4, 1977 [JP] Japan .................................. 52-24023

[51] Int. Cl.² ........................................... F02M 23/04
[52] U.S. Cl. ........................... 123/119 D; 123/124 A; 123/124 R
[58] Field of Search .............. 123/124 A, 97 B, 124 R, 123/124 B, 119 D; 261/DIG. 19, 39 A, 121 B

[56] References Cited

U.S. PATENT DOCUMENTS

| 2,154,417 | 4/1939 | Anderson | 123/124 R |
| 3,601,106 | 8/1971 | Nakajima | 123/124 R |
| 3,866,588 | 2/1975 | Nakada | 123/119 D |
| 4,015,568 | 4/1977 | Horiye | 123/124 R |
| 4,037,406 | 7/1977 | Hartel | 123/124 R |

FOREIGN PATENT DOCUMENTS

| 2258551 | 6/1973 | Fed. Rep. of Germany | 123/124 |
| 2541098 | 1/1976 | Fed. Rep. of Germany | 123/124 |

*Primary Examiner*—Ronald H. Lazarus
*Attorney, Agent, or Firm*—Robert E. Burns; Emmanuel J. Lobato; Bruce L. Adams

[57] ABSTRACT

An air-fuel ratio regulator for internal combustion engine, used mainly in the intake system of an automotive engine, comprising an air passage leading from the intake passage or the atmosphere upstream of the throttle valve in the carburetor to the intake passage downstream of the throttle valve, a control valve for opening and closing the air passage, and differential-pressure responsive means for actuating the control valve. The differential-pressure responsive means, consisting of a pair of vacuum chambers on either side of a diaphragm, opens the control valve during the high-speed operation or in rapid deceleration where the intake manifold vacuum generated downstream of the throttle valve increases rapidly, in order to prevent the intake air-fuel mixture from becoming rich, and to maintain the air-fuel ratio appropriately.

8 Claims, 2 Drawing Figures

AIR-FUEL RATIO REGULATOR FOR INTERNAL COMBUSTION ENGINE

DETAILED DESCRIPTION OF THE INVENTION

This invention relates to an apparatus for controlling air-fuel ratio, (hereinafter referred to as "air-fuel ratio regulator"), of an automotive engine by supplying air to the intake system as required.

As an automobile is decelerating, the choking action of the carburetor throttle valve rapidly increases intake vacuum downstream thereof. This rapidly vaporizes liquid fuel on the intake manifold walls, as a consequence of which the intake air-fuel mixture becomes over-enriched and the noxious carbon monoxide and hydrocarbons in the exhaust gas tend to increase. This problem due to the over-enrichment of the air-fuel mixture can effectively be prevented by supplying air to the intake system during the aforementioned unburned-gas increasing period.

The air-fuel mixture control valve (hereinafter referred to as MCV) has been known as an air feeder to attain the aforesaid object. This invention adds another useful function to the MCV; i.e., a function to restrict the formation of poisonous nitrogen oxides during high-speed engine operation.

Accordingly, a principal object of this invention is to provide an air-fuel ratio regulator especially for automotive internal combustion engine that supplies air to the intake system of the engine when the engine is under deceleration and other specific operating conditions.

Another object of this invention is to provide an air-fuel ratio regulator especially for automotive internal combustion engine that restrains the formation of hydrocarbons and carbon monoxide during deceleration and that of nitrogen oxides during high-speed running by supplying air to the engine intake system during the aforementioned operating periods.

Still another object of this invention is to provide an air-fuel ratio regulator especially for automotive internal combustion engine that is low in cost and simple in structure, and permits easy adjustment of operating period or operational delay through the pneumatic detection of deceleration and other specific operating conditions of the engine.

The aforesaid objects are achieved by an air-fuel ratio regulator for internal combustion engine comprising an air passage leading from the intake passage upstream of the throttle valve in the carburetor or the atmosphere to the intake passage downstream of said throttle valve, a control valve for opening and closing said air passage, differential-pressure responsive means for moving said control valve comprising a flexible diaphragm interposed between a pair of vacuum chambers, a spring urging said control valve in the closing direction, a vacuum passage communicating with one of said paired vacuum chambers directly and with the other through an orifice and a check valve arranged in parallel and opening into said intake passage downstream of the throttle valve, a passage leading from said second vacuum chamber to the atmosphere, and valve control means attached to the last-mentioned passage to perform open-close functions according to specific operating conditions of the internal combustion engine, wherein said control valve is adapted to open under rapid deceleration and other specific operating conditions of the internal combustion engine, or modifications of such regulator.

Now, an embodiment of this invention will be described in detail by reference to the accompanying drawings, FIGS. 1 and 2.

Figure 1:
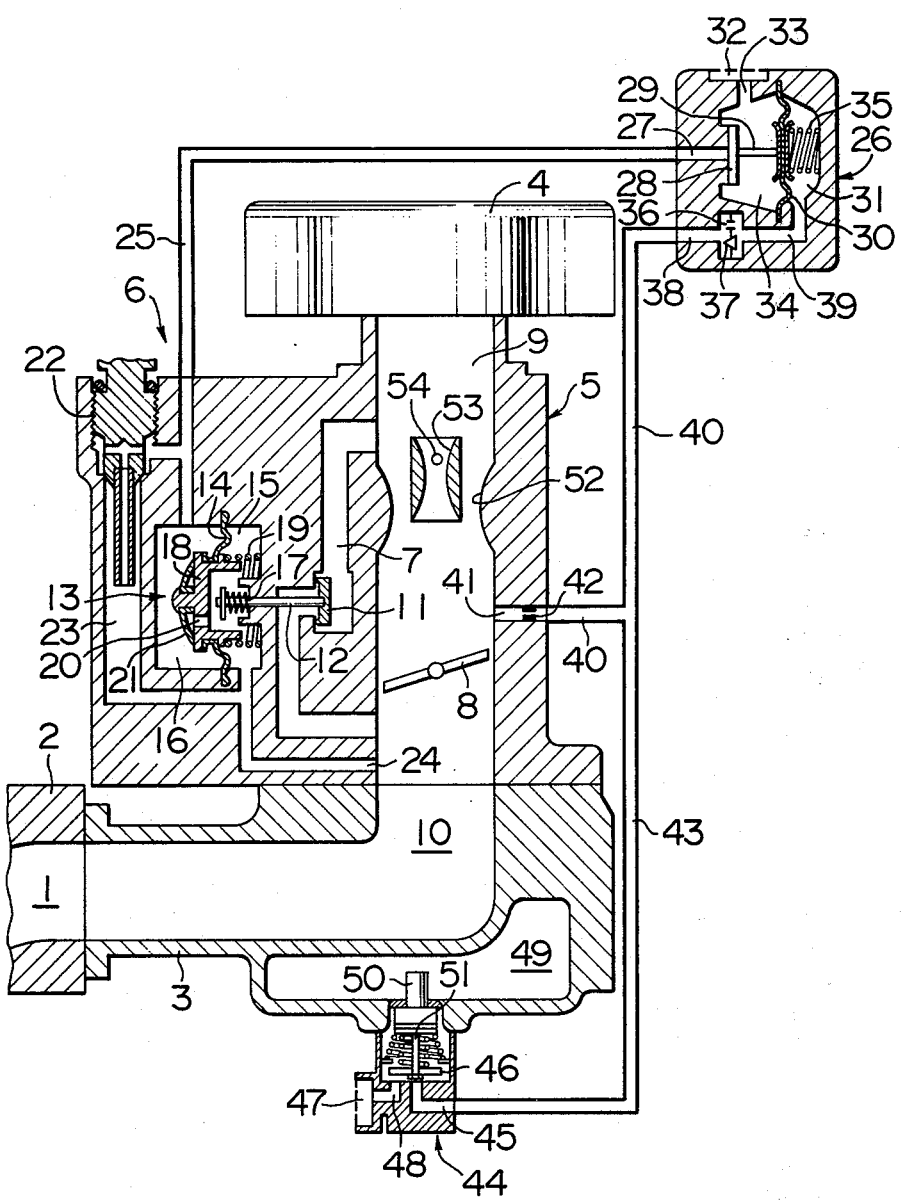
FIG. 1 is a cross-sectional view showing an embodiment of this invention.

In FIG. 1, reference numeral 1 designates an intake port formed in a cylinder head 2 of an engine proper that is not shown. An air-fuel mixture produced in a carburetor 5 from air introduced from an air cleaner 4 flows through an intake manifold 3 into said port 1.

An air-fuel mixture control valve (MCV) 6 is attached to the side of the carburetor 5. An air passage 7 formed in said MCV 6 constitutes a bypass, maintained at approximately atmospheric pressure, connecting an intake passage 9 upstream of a throttle valve 8 in the carburetor 5 and an intake passage 10 downstream of the throttle valve 8.

Midway through this air passage 7 is provided a control valve 11, which has a projected rod 12. The rod 12 protrudes into a vacuum chamber 15 that is one of a pair of vacuum chambers 15 and 16 separated by a diaphragm 14 of a differential-pressure responsive device 13, and is urged by a spring 17 in a direction in which the control valve 11 closes the air passage 7.

To the center of the diaphragm 14 is attached a check valve body 18 that is urged leftward by a spring 19.

The check valve body 18 is perforated with an airport 20 that connects said vacuum chambers 15 and 16, and fitted with an umbrella-shaped check valve 21 of rubber or other elastic material that permits the fluid to flow through said air-port 20 only from the vacuum chamber 15 to the vacuum chamber 16, and not in the opposite direction.

A pressure difference occurring between the vacuum chambers 15 and 16 acts to draw the check valve body 18 rightward in the illustration. When the drawing force becomes greater than the urging force of the spring 19, the check valve body 18 is displaced rightward to come into contact with the protruding end of said rod 12. Then, it pushes the rod 12 rightward, opposing a resultant force equivalent to the urging forces of the springs 17 and 19. When the drawing force resulting from the pressure difference between the vacuum chambers 15 and 16 exceeds a predetermined value, the forces of the springs 17 and 19 are overcome, and the rod 12 moves rightward to open the control valve 11.

Of the two vacuum chambers 15 and 16, the chamber 15 communicates with the chamber 16 through a vacuum passage 23 having an orifice 22, and also with the intake passage 10 through a vacuum passage 24. Meanwhile, the vacuum chamber 16 communicates with an opening 27 in a valve control device 26 through an air passage 25. Said valve control device 26 contains an open-close valve 28 to open and close the opening 27, a flexible diaphragm 30 connected with the open-close valve 28 through a rod 29 to actuate said open-close valve 28, a vacuum chamber 31 formed on one side of the flexible diaphragm 30, a chamber 34, having an opening 33 leading to the atmosphere through an air filter 32, formed on the other side of the diaphragm 30, a spring 35 urging the flexible diaphragm 30 in a direction to close the open-close valve 28, and a vacuum passage 39 connecting the vacuum chamber 31 with an opening 38 through an orifice 36 and a check valve 37 arranged in parallel.

Further, the opening 38 in said valve control device 26 communicates with a vacuum passage 40, which, in turn, communicates with a port 41 formed in a specific position in the intake passage wall slightly upstream of the throttle valve 8 in its full-close position where a vacuum of the characteristic to be described later occurs. Said port 41 has an orifice 42.

A passage 43 branched from the vacuum passage 40 communicates with a passage 45 in a thermostatic valve 44. Said passage 45 is opened and closed by a valve disc 46, and, when opened, communicates with a passage 48 that opens to the atmosphere through an air filter 47.

Said thermostatic valve 44 has a wax element 50 that protrudes in a cooling water passage 49 forming a heat riser for the intake manifold 3. A rod 51 is moved by the thermal expansion and contraction of the wax element 50, thereby actuating the valve disc 46. In this embodiment, the valve disc 46 opens the passage 45 when the water temperature in the cooling water passage 49 is below predetermined temperature about 70° C. and closes when the temperature is above about 70° C.

Reference numeral 52 designates an outer venturi, 53 an inner venturi, and 54 a main nozzle through which fuel is injected.

Next, the characteristics of the vacuum occurring in the port 41 will be described by reference to a power output chart shown in FIG. 2.

Figure 2:
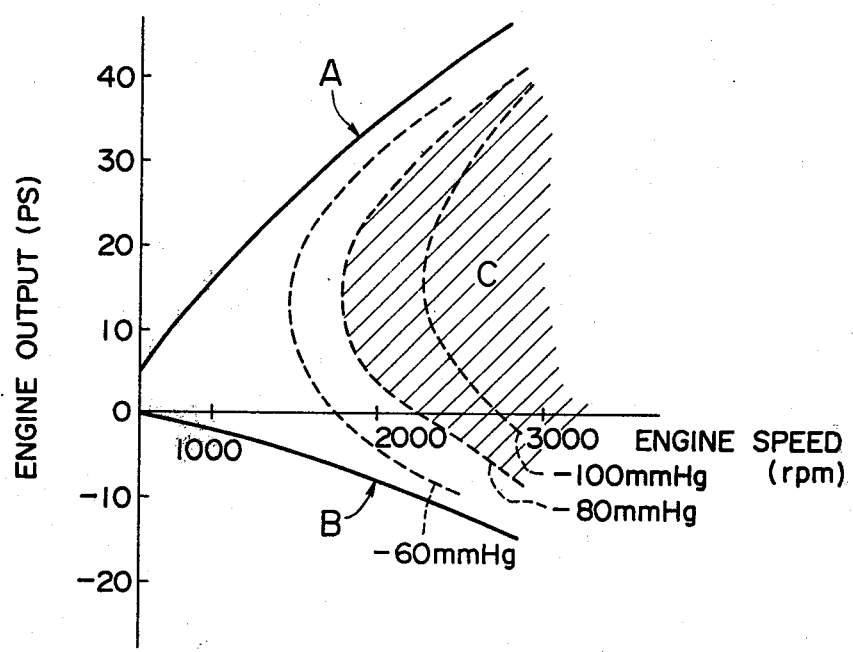
FIG. 2 is a power output chart illustrative of the operation of the embodiment.

In FIG. 2, a solid line A indicates the power output developed when the throttle valve 8 is fully open, a solid line B indicates the power output at idling, and three dashed lines are the isobaric curves for the vacuums of −60 mm Hg, −80 mm Hg and −100 mm Hg respectively occurring in the port 41.

As shown in FIG. 2, the vacuum in the port 41 increases according to an increase in the engine speed (rpm), and descreases as its curve approaches the full-open line A or the idling line B.

In the above-described arrangement, a vacuum generated in the intake passage 10 downstream of the throttle valve 8 (hereinafter called the intake manifold vacuum) is transmitted to the vacuum chamber 15 through the vacuum passage 24, and also to the vacuum chamber 16 through the vacuum passage 23 having the orifice 22. Therefore, when no air is supplied through the air passage 25, the intake manifold vacuum is transmitted to the vacuum chambers 15 and 16 as it is.

If the throttle valve 8 is rapidly closed to decelerate the automobile under such condition, the intake manifold vacuum increases rapidly. The increased vacuum is transmitted through the vacuum passage 24 to the vacuum chamber 15, thus immediately raising the vacuum level in said chamber 15. Meanwhile, the vacuum in the vacuum chamber 16 rises more slowly because of resistance against flowing since the increased vacuum is transmitted by way of the vacuum passage 23 having the orifice 22. As a consequence, a pressure difference arises between the chambers 15 and 16, which moves the diaphragm 14 and the check valve body 18 rightward against the urging force of the springs 17 and 19, thus opening the control valve 11. Air introduced through the intake passage 9 into the air passage 7 is supplied to the intake passage 10, whereupon the air-fuel mixture that has tended to become richer is diluted.

Under low-load conditions, where the throttle valve 8 is fully or nearly fully closed, the intake manifold vacuum is very high. When the throttle valve 8 is half-opened to produce the medium-load condition, the intake manifold vacuum decreases again. The decrease of vacuum is transmitted through the vacuum passage 24 to the vacuum chamber 15. At the same time, it is transmitted to the vacuum chamber 16 through the orifice 22 and, following the opening of the check valve 21, from the vacuum chamber 15 through the air-port 20. Therefore, the vacuums in both chambers 15 and 16 immediately follow a change in the intake manifold vacuum with little delay.

In rapid deceleration, the control valve 11 is opened to supply air to the intake passage 10, whereby enrichment of air-fuel mixture during deceleration is prevented and, therefore, unburned hydrocarbons, carbon monoxide and other exhaust emissions are reduced. Provision of the check valve 21 also is effective in checking an increase in the unburned emissions, since it accurately opens the control valve 11 even when acceleration and deceleration operations are continuously repeated in a short time, as in the case of gear shifting.

When the engine is cold, the valve disc 46 of the thermostatic valve 44 opens the passage 45 to connect the passage 43 with the passage 48 opening to the atmosphere, detecting that the water temperature in the cooling water passage 49 is under 70° C. Accordingly, atmospheric air is introduced into the vacuum chamber 31 through the passage 43, vacuum passage 40, opening 38 and vacuum passage 39. Then, the pressure in the vacuum chamber 31 becomes approximately atmospheric, because the orifice 42 keeps the chamber 31 substantially unaffected by the vacuum in the port 41. Therefore, the open-close valve 28, urged by the spring 35, closes the opening 27.

In contrast, when the cooling water temperature becomes higher than 70° C. after the engine warm-up, the valve disc 46 closes the passage 45 to shut off the supply of atmospheric air to the passage 43, whereupon the vacuum in the port 41 is introduced into the vacuum chamber 31.

Increasing of vacuum in the vacuum chamber 31, the diaphragm 30 is drawn against the force of the spring 35. When the vacuum becomes higher than a predetermined value, the diaphragm 30 is moved to open the open-close valve 28.

The drawing vacuum in the vacuum chamber 31 that opens the open-close valve 28 may be set up at will by suitably adjusting the pressure-receiving area of the diaphragm 30, the urging force of the spring 35 and other factors. If the vacuum is so set up as to open the open-close valve 28 in the high-speed operating range C hatched in FIG. 2, the air passage 25 is then connected through the chamber 34 with the opening 33 leading to the atmosphere. Consequently, atmospheric air is introduced into the vacuum chamber 16 through the opening 33, chamber 34, and air passage 25. Then, part of the introduced atmospheric air flows toward the vacuum passage 24 and vacuum chamber 15 through the vacuum passage 23, but exercises little influence due to the function of the orifice 22. The pressure in the vacuum chamber 16 becomes approximately atmospheric. Meanwhile, intake manifold vacuum is transmitted into the vacuum chamber 15 through the vacuum passage 24. Accordingly, even in the high-speed range C, a pressure difference arises between the vacuum chambers 15 and 16, thus opening the control valve 11 and supplying air from the air passage 7 to the intake passage 10. This renders air-fuel mixture leaner, reduces the generation of nitrogen oxides, and improves fuel economy.

If the MCV 6 were operated to supply air for diluting the air-fuel mixture during the high-speed operation under the warm-up condition, unstable engine operation, deterioration of passing ability and other problems undesirable from the standpoint of safety would arise. In practice, however, the supply of air in the high-speed range C is stopped by the function of the thermostatic valve 44.

Also, because of introducing the vacuum having the characteristics shown in FIG. 2, the operation of the MCV 6 and the supply of air are stopped in the high-load range. Consequently, a decrease in the power output at full throttle opening is prevented.

In this embodiment, the MCV 6 operates to supply air for a predetermined delay-time after the start of deceleration, thereby decreasing hydrocarbon and carbon monoxide emissions as mentioned before. This is also effective for the prevention of misfire and after-fire that are liable to occur especially during high-speed deceleration. Further, when a catalytic converter or other exhaust-gas cleaning device is provided in the exhaust system, it prevents the rise in an abnormal temperature and pressure rise in such devices.

The parallel arrangement of the orifice 36 and the check valve 37 in the vacuum passage 39 of the valve control device 26 controls time for transmitting of a vacuum, which occurs in the port 41 during the transient operation of the engine to the vacuum chamber 31. The open-close valve 28 does not open for a while after the engine enters said high-speed operation range C. Therefore, the MCV 6 does not operate for some time after the start of acceleration, thus preventing a reduction in drive-ability during acceleration.

Meanwhile, the vacuum in the port 41 drops during the transmission from high-speed to low-speed. But the transmission of this lowered vacuum to the vacuum chamber 31 is not delayed, since it is effected through the check valve 37. Therefore, the open-close valve 28 closes approximately immediately the engine has shifted from the high-speed range C to other operating range.

What is claimed is:

1. An air-fuel ratio regulator for an internal combustion engine comprising a carburetor having an air passage comprising an air inlet, venturi, a throttle valve downstream of said venturi and an intake passage downstream of said throttle valve, a by-pass air passage leading from said air inlet to said intake passage, first control valve means in said by-pass air passage for opening and closing same, said control valve means comprising a valve member movable between an open position and a closed position, a valve stem for moving said valve member, spring means acting on said valve member to bias it to closed position, a differential pressure responsive means comprising a diaphragm disposed to act on said valve stem to move said valve member to open position, a first vacuum chamber on one side of said diaphragm, a second vacuum chamber on the opposite side of said diaphragm, said vacuum chambers being so disposed that said diaphragm is moved in a direction to open said valve means when pressure in said second vacuum chamber is higher than pressure in said first vacuum chamber, first passage means connecting said first vacuum chamber directly with said intake passage, second passage means comprising a restricted orifice and a check valve connected in parallel with one another connecting said second vacuum chamber with said intake passage, said check valve being disposed to permit flow only from said first vacuum chamber to said second vacuum chamber, third passage means leading from said second vacuum chamber to the atmosphere and second control valve means in said third passage means, said second control valve means being responsive to specific operating conditions of the engine to apply atmospheric air pressure to said second vacuum chamber.

2. An air-fuel ratio regulator according to claim 1, in which said second control valve means comprises an open-closed valve for respectively opening or closing said third passage means, a second flexible diaphragm for actuating said open-closed valve, spring means biasing said valve to closed position, a third vacuum chamber on one side of said flexible diaphragm, said third vacuum chamber being disposed to move said second flexible diaphragm to open said open-closed valve upon predetermined pressure reduction in said third vacuum chamber, and fourth passage means leading from said third vacuum chamber to a port in said air passage between said venturi and said throttle valve, whereby said second flexible diaphragm is actuated to open said open-closed valve when the engine is operating in a high-speed range.

3. An air-fuel regulator according to claim 2, in which a restricted orifice and a check valve are disposed in parallel with one another in said fourth passage means leading from said third vacuum chamber to said port, said check valve being disposed to permit flow only in a direction toward said third vacuum chamber.

4. An air-fuel ratio regulator according to claim 2, comprising fifth passage means connected with said fourth passage means intermediate said third vacuum chamber and said port and leading to the atmosphere, and thermostatic valve means responsive to engine temperature for opening said fifth passage means to the atmosphere when the engine temperature is below predetermined value.

5. An air-fuel ratio regulator according to claim 4, in which a restricted orifice is disposed in said fourth passage means intermediate said port and the connection of said fourth passage means with said fifth passage means.

6. An air-fuel ratio regulator according to claim 2, in which a chamber open to the atmosphere is disposed on the side of said second flexible diaphragm opposite said third vacuum chamber.

7. An air-fuel ratio regulator according to claim 1, in which a check valve body is disposed in said flexible diaphragm between said first and second vacuum chambers, and in which said check valve is disposed in said check valve body.

8. An air-fuel ratio regulator according to claim 7, comprising spring means acting on said check valve body to bias said flexible diaphragm in a direction toward said second vacuum chamber.

* * * * *